June 18, 1968      KATASHI AOKI      3,388,431
INJECTION MOLDING MACHINE

Filed May 11, 1965      7 Sheets-Sheet 1

INVENTOR
Katashi Aoki

June 18, 1968  KATASHI AOKI  3,388,431
INJECTION MOLDING MACHINE

Filed May 11, 1965  7 Sheets-Sheet 2

Katashi Aoki
INVENTOR.

BY Wenderoth,
Lind & Ponack, attorneys

June 18, 1968     KATASHI AOKI     3,388,431
INJECTION MOLDING MACHINE

Filed May 11, 1965                            7 Sheets-Sheet 3

INVENTOR

Katashi Aoki
INVENTOR

BY Wenderoth,
Lind and Ponack, Attorneys

United States Patent Office 3,388,431
Patented June 18, 1968

3,388,431
INJECTION MOLDING MACHINE
Katashi Aoki, 6037 Oaza Minamijo, Sakaki-machi,
Nagano-ken, Hanishina-gun, Japan
Filed May 11, 1965, Ser. No. 454,831
Claims priority, application Japan, May 16, 1964,
39/37,746; Dec. 4, 1964, 39/93,322; Dec. 18,
1964, 39/70,997
2 Claims. (Cl. 18—42)

ABSTRACT OF THE DISCLOSURE

A mold and a mold control device for use with an injection molding machine, comprising, in combination a stationary mold incorporating at least one female mold, at least one rotating core having male screw-threads around its outer periphery and aligned with said female mold for engagement with said female mold, an ejector plate around said rotating core, a single control screw member directly coupled to said rotating core and theadedly coupled to said ejector plate, a motor coupled to said control screw member for rotating said control screw member and said core and advancing said ejector plate in synchronism with the rotation of said control screw member and core in one direction and retracting said ejector plate with the rotation of control screw member and said core in the other direction, said ejector plate being adapted to knock the molded product out of said core.

This invention relates generally to the art of injection molding, particularly to the method of processing thermoplastic materials into threaded caps, joints, couplings, nuts and many other screw-threaded articles, and more particularly to the apparatus employed to carry said method into practice.

The thermoplastic materials herein referred to include, for example, vinyl chloride, cellulose acetate, polystyrene, polyethylene, methacryl resin, polycarbonate, nylon and the like.

The most important part of such injection molding process lies in the opening and closing mechanism of stationary and moving molds. Attempts have been made to control the operation of the mold so as to strip the finished plastic product from the mold without being deformed or damaged. None of them, however, proved satisfactory.

Whereas, it is the primary object of the present invention to provide new and useful improvements in the injection molding machine whereby synthetic resins are processed into a single or a plurality of items, say for example threaded caps for containers, at one cycle of operation without causing deformation or damage to the finished item.

It is another object of the invention to provide novel control means for opening and closing the mold which lends itself to the rapid and automatic production of threaded plastic articles having the desired shape conforming to the internal configuration of the mold and which facilitates the stripping of the finished article or articles from the mold automatically and without causing deformation or damage thereto.

It is a further object of the invention to provide useful means for controlling the operation of stationary and moving molds, said means consisting of a core member cooperating said the molds and rotatable to permit the finished plastic items to strip automatically and smoothly from the molds.

It is further and another object of the invention to provide improved mold control means compirsing a stationary mold, a rotating core having a threaded periphery to engage with said mold and a screw member adapted to control the rotation of said core, whereby it is made possible to knock out the finished plastic product automatically from the core.

It is a still another object of the invention to provide improved mold control means comprising a rotating core, an ejector plate associated therewith and a control screw member, said screw member synchronizing with the rotation of said core and with the forward movement of said ejector plate thereby permitting the finished plastic product to knock out automatically and smoothly from the core.

It is a still further and another object of the invention to provide improved injection molding machine of the type suitable for the rapid automatic production of screw-threaded plastic items and suitable for the mounting of and being controlled by the mold control means mentioned in the foregoing objects.

It is another object of the invention to provide novel methods and means of processing plastic materials into a single or a plurality of items at one cycle of operation of the injection molding machine hereinabove described.

These and further objects together with the advantages of the present invention will become more apparent from the following description taken in connection with the accompanying drawings in which:

FIG. 1 is a perspective view of the injection molding machine having a mold control unit as combined with an injection unit;

FIGS. 2–4, inclusive, are utilized to explain the construction and operation of a mold control unit embodying the present invention; FIG. 2 being a longitudinal cross-sectional view of the units shown as in molding position; FIG. 3 being a longitudinal cross-sectional view of the same shown as causing a pair of molds (stationary mold and moving core) to separate from each other thereby permitting the threaded finished product to strip from the moving core, and FIG. 4 being a longitudinal cross-sectional view of the same shown with the finished product automatically falling apart from the moving mold;

FIG. 5b is a cross-sectional view taken on the line $V_b$—$V_b$ of FIG. 5a;

Figure 6:
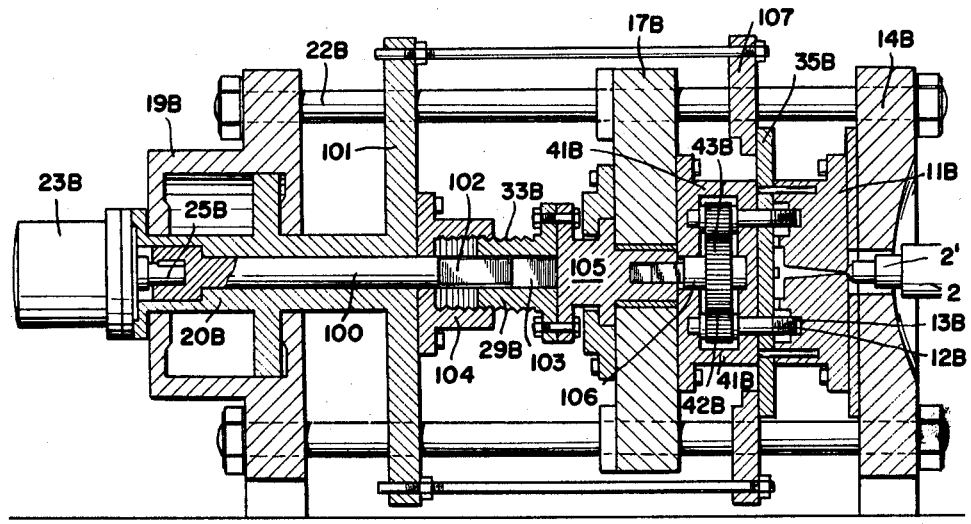
Figure 7:
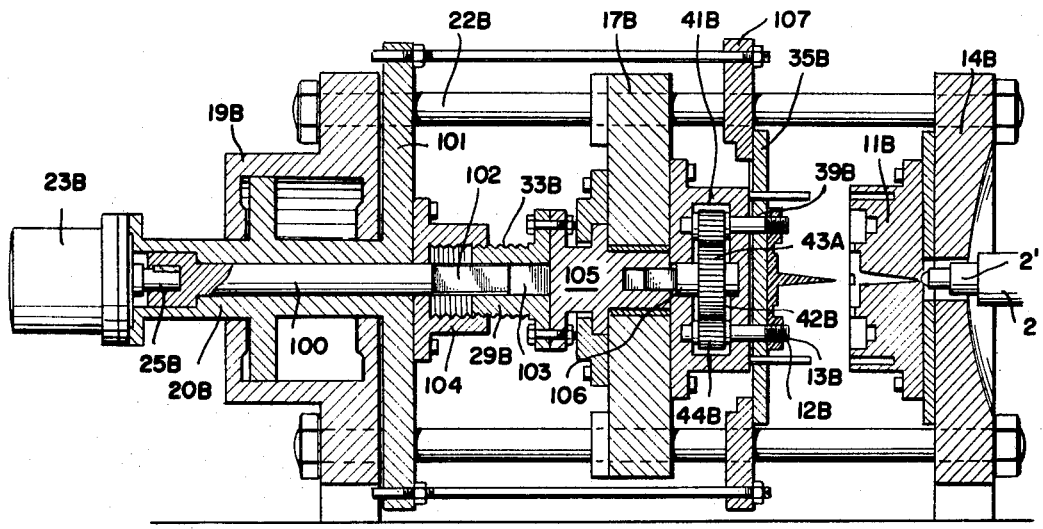
Figure 8:
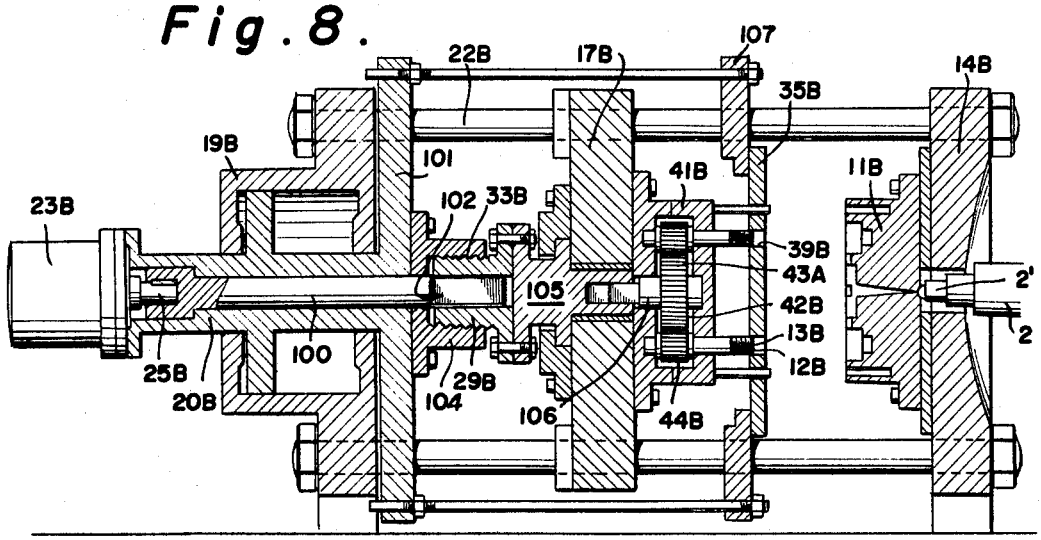
Figure 9:
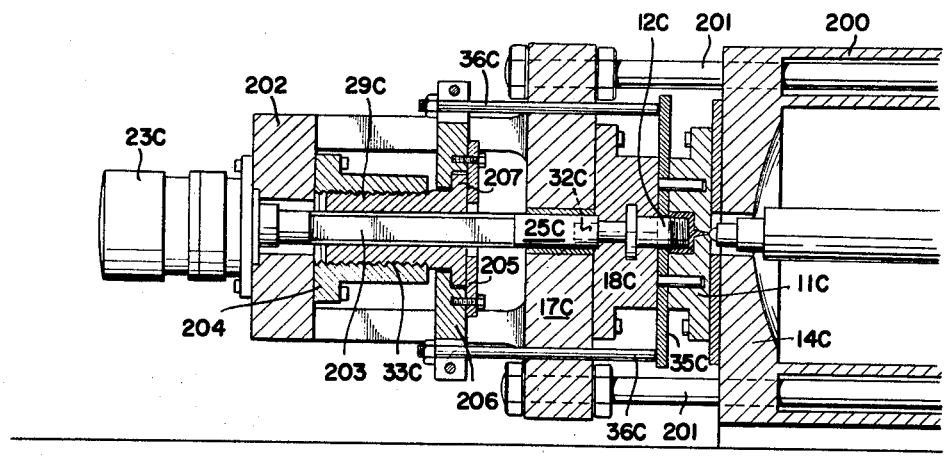
Figure 10:
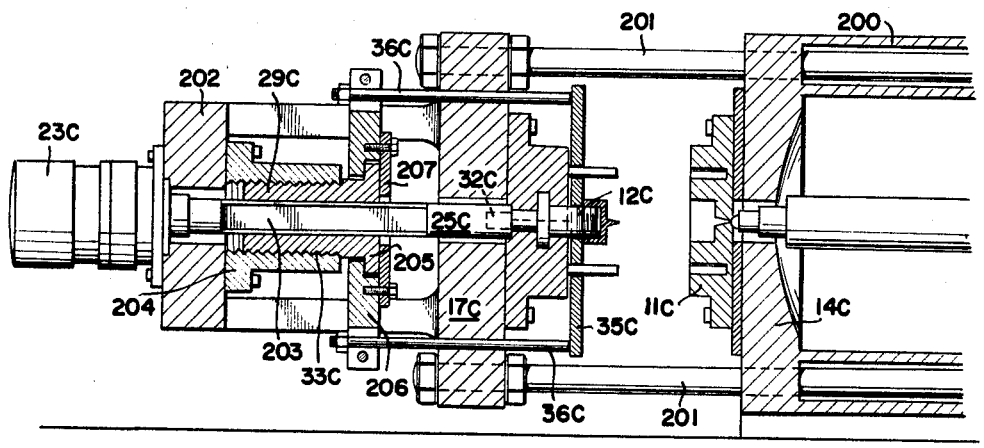

FIGS. 6–8, inclusive, are utilized to explain the construction and operation of another mold control unit embodying the present invention; FIG. 6 being a longitudinal cross-sectional view of the unit shown as in molding position; FIG. 7 being a longitudinal cross-sectional view of the same shown as causing a pair of molds to separate from each other, and FIG. 8 being a longitudinal cross-sectional view of the same shown as in a position subsequent to ejection of the molded product; and FIGS. 9–11, inclusive, are utilized to explain the construction and operation of a third mold control unit embodying the present invention; FIG. 9 being a longitudinal cross-sectional view of the unit shown as in molding position; FIG. 10 being a longitudinal cross-sectional view of the same shown as causing a pair of molds to separate from each other, and FIG. 11 being a longitudinal cross-sectional view of the same shown as in a position subsequent to ejection of the molded product.

Figure 1:
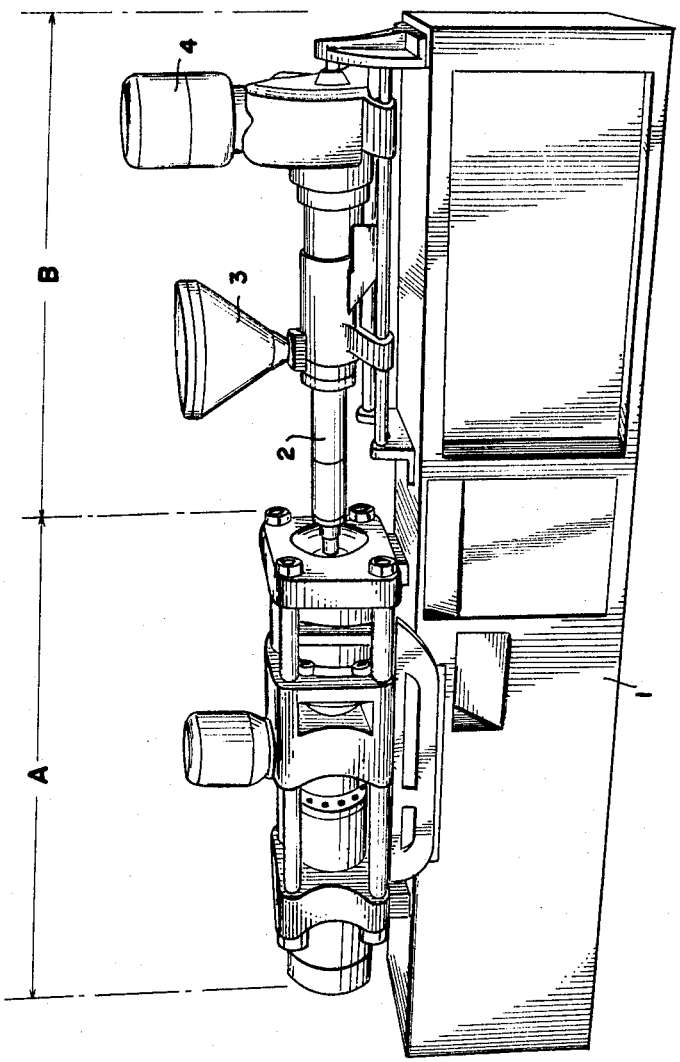

Reference to FIG. 1 shows the injection molding machine comprising a mold control unit A and an injection unit B that are mounted on a bed 1. While the mold control unit A will be fully described hereinafter, the injection unit B comprises a heating cylinder 2 having an injection nozzle 2', a hopper 3 for introducing plastic material into said cylinder, a plunger and its drive 4 and all other components required to complete the injection operation. Since this injection system is well known to those skilled in the art, may be of any ordinary type, and does not constitute essential part of the invention, no further description thereof will be made.

Figure 2:
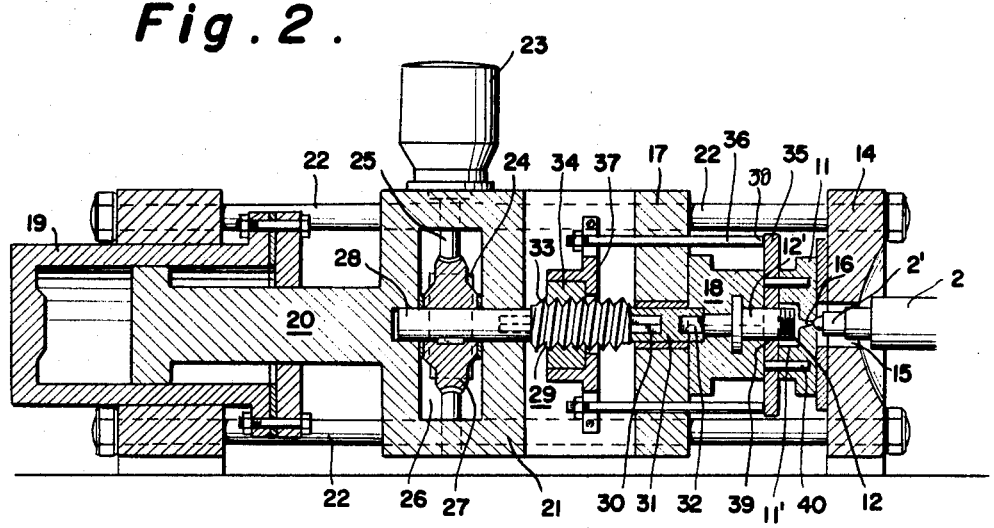
Figure 3:
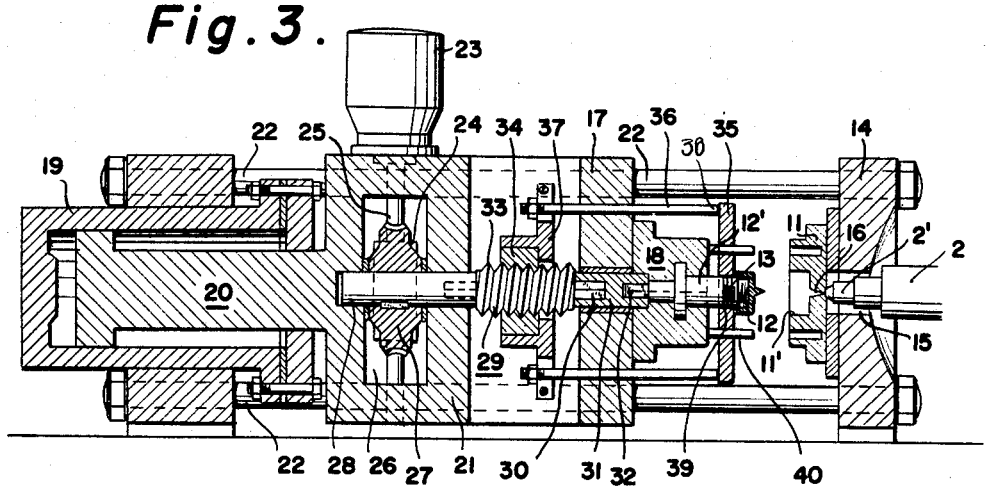
Figure 4:
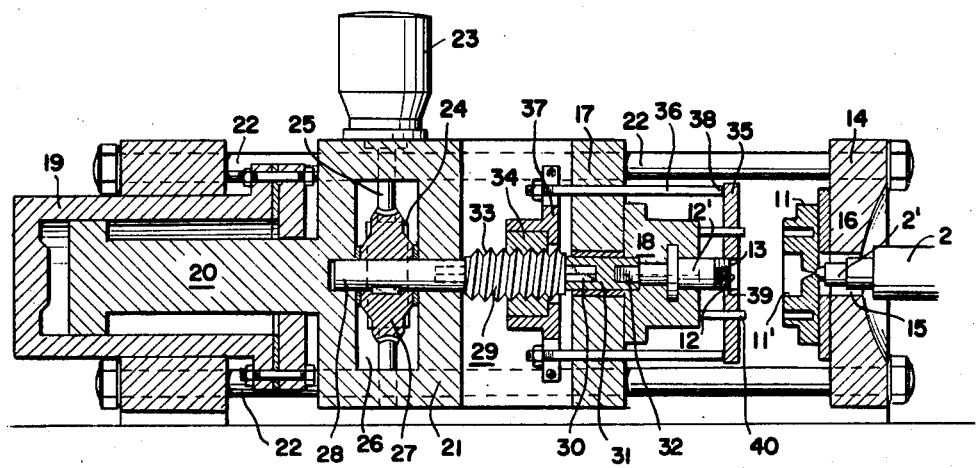

The mold control unit A is schematically shown as a first embodiment of the invention in FIGS. 2–4, wherein the reference numeral 11 designates a stationary mold and the numeral 12 designates a core adapted to fit into the female part 11' of the stationary mold 11 and having male screw-threads 13 on its periphery. The stationary mold 11 is bolted to a mold mount 14 having a central hole 15 through which the nozzle 2' of the heating cylinder 2 extends toward the stationary mold 11. The molten material is injected from the nozzle 2' through a sprue 16 and enters the cavities of the mold 11. The screw core 12 has its stem 12' connected fixedly by bolts to a moving mold clamp 17. A holder 18 is adapted to keep the screw core rotatably in position. The mold clamp 17 is connected fixedly by bolts to a main moving frame 21 connected integrally with a clamp ram 20 which recirpocates under oil pressure through a clamping cylinder 19.

There are provided four tie bars 22 adapted to connect the stationary mold mount 14 with the cylinder 19 and extending through the moving mold clamp 17 and the main moving frame 21. The moving mold clamp 17 and the main moving frame 21 slide reciprocally under oil pressure along the tie bars.

The frame 21 has mounted thereon a suitable drive means such as an electric motor or hydraulic motor whose drive shaft 25 has a worm 24 at the tip end thereof and extends into the space 26 of the main frame 21. There is provided a worm gear 27 in the space 26 for engagement with the worm 24 of the drive shaft. The worm gear 27 is mounted on a rotating shaft 28 which extends through the main frame 21 and has a control screw member 29 rotatably mounted on the tip end thereof. The control screw member 29 has a square shaft 30 extending at one end thereof into the moving mold clamp 17 and being indirectly connected through a coupling bearing 31 in the mold clamp 17 to a coupling square shaft 32 extending from the stem 12' of the screw core 12. The control screw member 29 is provided at its periphery with the male screw-threads 33 equal in screw lead to or approximating the screw lead of the male screw-threads 13 of the screw core 12, said male screw threads 33 being engaged with the female threads of a rotating coupling member 34 fitted into a moving plate 37 having two shafts 36 extending through the ejector plate 35. Each of the two shafts of the moving plate 37 extends slidably through the moving mold clamp 17 while its free end 38 bears against the ejector plate 35. The ejector plate 35 facing the screw core 12 has as many openings 39 as the number of screw cores 12 available, said openings having a diameter slightly larger than the outside diameter of the screw core 12 and being adapted to permit the screw core 12 to move in and out therethrough. The ejector plate 35 is further slidably supported by a guide pin 40 extending from the moving mold clamp 17 or may be supported on the core stem 12' instead of using said guide pin. The shaft 36 has one end thereof connected to the moving plate 37 and may be flexibly coupled with its associated members to permit the adjustment of its stroke depending upon the size of the desired plastic product.

It will be obvious that the stationary mold, screw core and control screw member may be readily replaced with the ones having a shape and size conforming with the particular molding conditions.

To simplify the illustration of the invention, the cooling water path in the mold, the oil path in the clamping cylinder, the oil pressure circuit, the operating switches and the electrical wirings will not be dealt with herein because they are all well known to those skilled in the art and are in the usual practice.

The mold control unit above described may be mounted on the bed 1 by suitable means and placed into operation with the usual injection unit B. It has been described in connection with the case where a single piece of molded article is to be processed at a time, but it will be understood that the device can handle a plurality of molded articles simultaneously with equal results; for example, the number of plastic pieces being 4, 12, 16 and so on. In such instance, the mold shown in FIG. 5 may be adapted to the mold control unit.

Figure 5A:
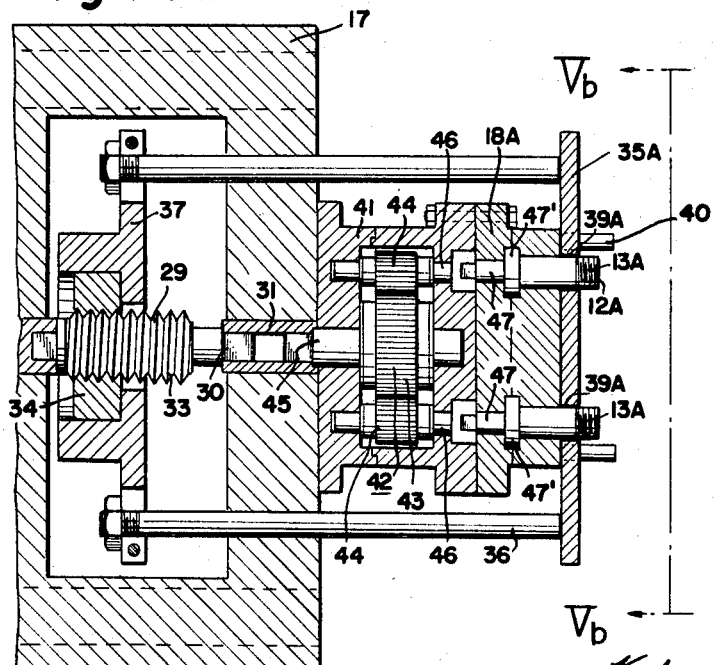
FIG. 5a is a longitudinal cross-sectional view of the mold designed for producing a plurality of threaded plastic articles at the same time, said mold being attached to the mold control unit shown in FIGS. 2–4.
Figure 5B:
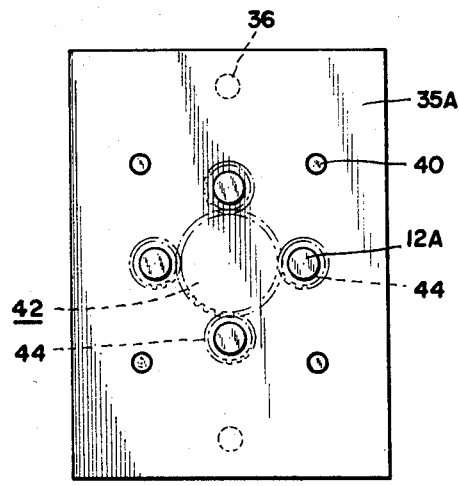

The mold structure of FIG. 5 includes a gear box 41 mounted removably before the moving mold clamp 17 and having journalled therein an interlocking gear group 42. The interlocking gear group 42 comprises a main gear 43 and "$n$" numbers of sub-gears engaging therewith. The number of these sub-gears agrees with the number of molded articles desired, e.g. the number of cores. The main gear 43 has its drive shaft 45 removably coupled through the coupling bearing 31 in the mold clamp 17 with the square shaft 30 of the control screw member 29 and rotates with the rotation of the control screw member 29. The rotary movements of the sub-gears 44 in mesh with the main gear 43 is transmitted by the axle 46 to the screw core 12A coupled to the end of said axle. The screw core 12A is arranged to connect the shaft 47 with the axle 46 and receives the rotating torque from the axle 46, as already stated. It is rotatably journalled in a housing 18A bolted down before the gear box 41. Designated at 47' is the collar for the shaft 47.

The ejector plate 35A is mounted before the housing 18A and is provided with an opening 39A through which the screw core 12A extends. The ejector plate 35A is further supported in place by means of guide pins or the ejector shaft 36 of the moving plate 37 and is arranged to move forward with the advancement of the moving plate 37 caused by the rotation of the control screw member 29 during the closing of the mold upon completion of the molding operation.

The male screw 13A formed around the outer periphery of the screw core 12A is threaded inverse to the female screw 33 of the contol screw member 29 and is determined in its screw lead by the gear ratio of the main gear to the sub-gears which may be as follows:

| Number of molding pieces: | Gear ratio |
|---|---|
| 4 | 1:2 |
| 12 | 1:5 |
| 16 | 1:5 |

Accordingly, the screw lead of the control screw member may be represented by:
$$L = l \cdot n$$
where $L$=Screw lead of the control screw member
$l$=Screw lead of the molded product (or the screw core)
$n$=Sub-gear to main gear ratio Based on the above formula, when four pieces of molded article are to be produced, the screw lead ratio of the screw core 12A to the control screw member 29 is 1:2.

It follows that the speed of forward movements of the moving plate 37, hence the ejector plate 35A caused by the rotation of the control screw member 29 coincides with the speed at which the molded product is knocked out from the male screw-threads of the screw core 12A.

It will be appreciated that the mold shown in FIG. 5 is built for the production of a plurality of plastic articles at the same time and may be readily combined in operation with the mold control unit according to the invention in a manner similar to the single-piece molding arrangement illustrated in FIGS. 2–4.

Another mold control unit embodying the invention will be described in connection with FIGS. 6–8, from which it will be obvious that the construction of this embodiment is basically identical with that shown in FIGS. 2–4, except for the arrangement in which the drive unit for driving the control screw member is positioned in the rear of the mold clamping cylinder. The clamping ram 20B reciprocating under oil pressure through the clamping cylinder 19B has its rear end connected with an electric motor or hydraulic motor 23B, while the drive shaft 25B thereof and the interlocking rotary shaft 100 connected therewith are rotatably mounted within the clamping ram 20B. The clamping ram 20B has its tip end mounted transversely with a moving plate 101, while the square portion 102 of the rotary shaft 100 extends beyond the moving plate 101 and connects with the square hole 103 of the control screw member 29B.

The control screw member 29B has a male screw 33B threaded around its periphery for engagement with the female screw hole of a socket member 104 in front of the moving plate 101. The control screw member 29B is further connected with a rotating shaft bearing 105 mounted on the moving mold clamp 17B. Removably mounted on this clamp is a gear box 41B containing an interlocking gear group 42B of which the main gear 43 has its shaft 45B connected with the coupling shaft bearing 105.

The screw lead relations between the male screw 33B of the control screw member 29B and the sub-gear 44B, screw core 12B and male screw 13B of the screw core are the same with the mold arrangement shown in FIG. 5 already described.

Designated at 22B are four pieces of tie rod connecting the clamping cylinder 19B with the stationary mold mount 14B having a stationary mold 11B. Along these tie rods, the moving plate 101 and the mold clamp 17B slide back and forth depending upon the movement of the mold clamping ram 20B. The moving plate 101 has a shaft 106 with which to connect with a holder 107 carrying the ejector plate 35B. This holding member 107 together with the moving plate 101 slides back and forth along the tie rods 22B.

The mold mount 14B has mounted thereon a nozzle 2' of heating cylinder 2 for injecting the plastic feed material into the stationary mold 11B.

Thus, the foregoing mold control unit may be combined with the injection unit thereby forming a complete injection molding machine.

Figure 11:
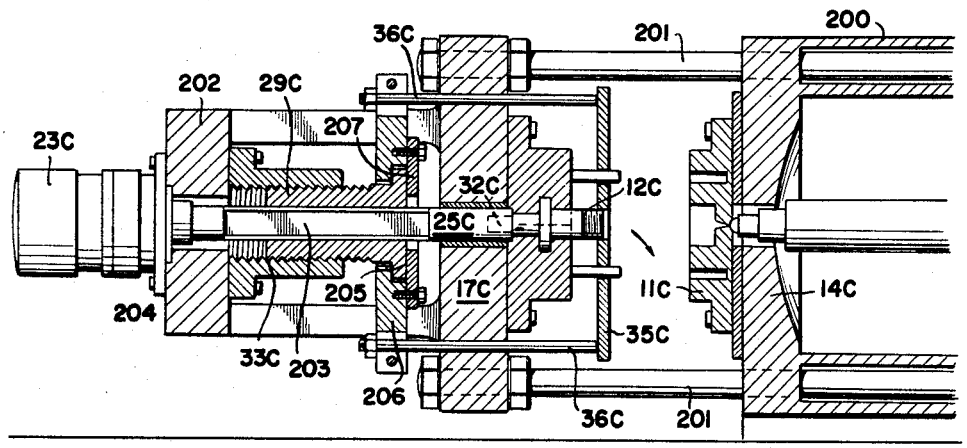

Reference to FIGS. 9–11 shows another mold control unit embodying the invention, in which the stationary mold 11C is mounted on a stationary mold mount 14C while the machine frame 200 integrally formed with said mold mount 14C has four pulling shafts 201 extending therethrough. These shafts are connected at their tip ends with a suitable drive (not illustrated) whereby the shafts are moved reciprocally to move the moving mold clamp 17C toward and away from the stationary mold 11C.

In front of the moving mold clamp 17C is provided a housing 18C for rotatably holding the screw core 12C. The screw core 12C has a square coupling shaft 32C connected with the end of drive shaft 25C of an oil motor 23C and is driven by this motor. The motor 23C is mounted on the frame 202 in the rear of the moving mold clamp 17C and has its drive shaft 25C mostly formed square 203 except the portion which extends into the clamp 17C. The square part of the shaft 25C is engaged with the control screw member 29C which has a male screw 33C threaded around its outer periphery for engagement with the female screw of a socket member 204 securing the control screw member 29C to the frame 202. The control screw member 29C has its stem part 205 rotatably housed in the moving plate 206 and held from turning loose from the moving plate by means of a stopper plate 207 attached to the moving plate 206.

The moving plate 206 is connected with the ejector plate 35C and further with the shaft 36C sliding within the mold clamp 17C at controlled stroke. The screw lead of the control screw member 29C and that of the screw core 12C are the same with the single-piece molding arrangement illustrated, and for the plurality-piece molding operation, the screw lead of the respective part may be determined by the gear ratio of interlocking gears in the gear box as hereinabove described.

Having thus described the construction and arrangement of each of the few examples of mold control unit embodying the invention, description will now follow to account for the operation thereof.

The process steps involved in the injection molding operation may be largely classified as follows:

Clamping → injection → molding and cooling → mold separation and core rotation → product stripping → reverse core rotation → clamping Each of these steps will be discussed below in connection with each of the above-described molding systems embodying the invention.

Referring to FIGS. 2–4, the clamping ram 20 advances upon introduction of oil into the clamping cylinder 19. At which time, the moving plate 37 connecting with the control screw member 29 is positioned behind the control screw member 29 while the ejector plate 35 is positioned close to the core housing 18, with the screw core 12 extending outwardly through the opening 39 of the ejector plate 35.

As the clamping ram 20 advances, so does the main frame 21 along the tie rods 22 until the screw core 12 enters the female part of the stationary mold 11 and upon touch-up, causes the clamping ram 20 to stop thereby completing the clamping operation.

Subsequently, the molten material in the heating cylinder 2 is injected from the nozzle 2' into the cavities of the mold, thus completing the injection operation.

The molds are now opened allowing time sufficient for the molded product C to become cool and solidified. In this mold opening operation, the screw core 12 is inserted into the female part of the stationary mold 11 and rotated slightly counter-clockwise to cause the motor 23 to operate rotating its drive shaft 25 clockwise, while the rotary shaft 28 is caused by the worm 24 and worm gear 27 to rotate counter-clockwise. Since the square coupling shaft 32 of the screw core 12 is coupled through the coupling bearing 31 with the square shaft 30 of the control screw member 29 coupling with the rotary shaft 28, the rotation torque of the rotary shaft 28 is transmitted through the control member 29 to the screw core 12 thereby causing the screw core 12 to rotate in a counter-clockwise direction.

As the control screw member 29 and the screw core 12 thus begin to rotate counter-clockwise, the rotary coupling member 34 engaged with the control screw member 29 is moved forward by the male screw 33 of the screw member, and hence, the moving plate 37 is moved forward with the result that the projecting shaft 36 slides forward within the clamp 17 and pushes the ejector plate 35 bearing against the stationary mold 11 toward the same. In this manner, with the control screw member 29 and the screw core 12 continued to rotate while the pressure exerted upon the clamping ram 20 of the clamping cylinder 19 is held nil, the pressure acting upon the ejector plate 35 is directed as a counter-force to the stationary mold 11, said counter-force being transmitted through the shaft 36 in contact with the ejector plate 35 to the moving plate 37 so that the main frame 21 is caused to retract by the rotary coupling member 34 and the control screw member 29. The retraction of the main frame 21 causes the screw core 12 to retract while turning along the female screw-threads of the molded product C in the female part 11' of the stationary mold 11.

When the screw core 12 has retracted with its tip end stripped about two-fifths of the screw threads of the molded product C as illustrated in FIG. 3, the clamping ram 20 begins to retract under oil pressure supplied by a limit switch (not illustrated) to the clamping cylinder 19 and at the same time, the main frame 21, moving mold clamp 17 and screw core 12 connected therewith all start retraction. During the retraction of these parts, the control screw member 29 and the screw core 12 continue to rotate so that the screw core 12, while rotating within the molded product C, permits the same to strip from the female part 11' of the stationary mold 11. This is accomplished by the control screw member 29 whose rotary shaft pushing the ejector plate 35 forward. That is, the molded product C is completely knocked out by the cooperation of the rotating core 12 and the advancing ejector plate 35 as illustrated in FIG. 3.

Subsequent to the stripping of the molded product C from the mold, the clamping ram 20 discontinues its retraction followed by the reverse rotation of the motor 23 thereby causing the control screw member 29 to rotate clockwise and retracting the moving plate 37 and the shaft 36 to their respective predetermined positions, when the reverse rotation of the motor is held to a stop. This is followed by the final clamping of the machine, thus completing one cycle of injection molding operation.

Since the ejector plate 35 is arranged to freely slide along the guide pin 40, it will hit the stationary mold 11 at the next clamping operation but will retract with the stationary mold 11 along the guide pin 40 as far back as it contacts the shaft 36.

The operation of the injection molding machine has been described for the production of a single-piece molded product per cycle of operation, but in order to obtain a plurality of molded articles at one cycle of machine operation, the mold of the type illustrated in FIG. 5 may be adapted without substantially changing the mode of operation. In the production of a number of plastic molded items at one cycle of operation, it is necessary to rotate the control screw member 29 and the main gear 43 in the clockwise direction and the sub-gear 44 and the screw core 12A in the counter-clockwise direction immediately before and during the opening of the mold. This is because the control screw member 29 and the screw core 12A are threaded inverse to each other.

Reference will now be had to FIGS. 6–8, wherein there is illustrated another embodiment of the invention.

The operation of this example is the same as has been described about each of the operation steps involved. Namely, the clamping and injection of the molten material take place with the clamping ram 20B advancing under oil pressure, followed by the cooling and solidification of the molded product as illustrated in FIG. 6. The motor 23B is subsequently driven to rotate the interlocking drive shaft 100 clockwise, causing the control screw member 29B and the main gear 43B coupling therewith through the bearing 105 and the shaft 106 to similarly rotate in the clockwise direction. The rotation of the control screw member 29B takes place in engagement with the female screw hole of the socket 104, and thus the control screw member 29B retracts while rotating within the socket 104 (at which time the square hole 103 of the control screw member 29B slides along the square shaft 102), making the moving plate 17B retract through the bearing member 105. The retraction of the moving plate 17B is accompanied with the retraction of the gear box 41B and the screw core 12B, so that the screw core 12B receives the rotation of the control screw member 29B through the main gear 43B and sub-gear 44B (rotation of this sub-gear being counter-clockwise) and moves slightly apart from the molded product in the mold. In this instance, the ejector plate 35B serves to hold the molded product so that the rotation of the screw core 12B is rendered smooth.

As the screw core 12B rotates and moves gradually apart from the threaded portion of the molded product, the clamping ram 20B begins to retract causing the molds to open with the product deposited upon the screw core 12B, permitting the molded product to leave the stationary mold 11B. Continuing the rotation of the control screw member 29B permits the screw core 12B to retract in rotation until it completely comes apart from the molded product while the latter is being withheld by the ejector plate 35B, thus achieving the automatic knock-out of the molded article or articles. Subsequently, the clamping ram 20B comes to a stop and the motor 23B begins reverse rotation, causing the control screw member 29B to rotate in the counter-clockwise direction advancing the moving plate 17B and the screw core 12B, whereupon the screw core 12B extends completely through the opening 39B of the ejector plate 35B. Thus, a complete cycle of molding operation is over to be followed by the next cycle.

Reference to FIGS. 9–11 shows the last example of the injection molding machine embodying the invention, the operation of which ranging from the clamping, knock-out of the product to the return of the screw core being substantially the same with the foregoing example.

In the embodiment illustrated in FIGS. 9–11, the clamping takes place with the moving mold clamp 17C pulled by the shaft 201 toward the stationary mold 11C. After the molten material is injected, molded, cooled and solidified as shown in FIG. 9, the motor 23C is driven to rotate the control screw member 29C in the clockwise direction. With the rotation of the control screw member, the moving plate 206 advances and presses the ejector plate 35C against the stationary mold 11C, when there is produced a counteracting force (as described in connection with the embodiment shown in FIGS. 2–4) which causes the moving mold clamp to retract so that the screw core 12C retracts in rotation (at which time the pulling force upon the moving mold clamp is held nil). Subsequently, the molds are opened (as the shaft 201 makes the moving plate retract) as shown in FIG. 10, and with the control screw member 29C continued to rotate, the molded product is completely stripped and knocked out from the core by the cooperation of the rotating screw core 12C and the advancing ejector plate 35C.

After the molded product is thus knocked out and the moving mold clamp 17C stops its retraction, the motor 23C is reversed thereby causing the control screw member 29C to rotate counter-clockwise and retract together with the moving plate 206 simultaneously as the ejector plate 35C retracts. In this manner, the machine is ready for the subsequent cycle of operation.

Having thus described the construction and operation of the injection molding machine embodying the invention, it will be understood that the plastic molded product or products can be smoothly and automatically knocked out from the mold without being deformed or damaged because of the action of the control screw member to control the rotation of the screw core and make the forward movement of the ejector plate or the retraction of the core synchronize with the rotation of the core.

The control screw member has been described to start its rotation before the molds are opened, but in some instances, it may be made to rotate upon completion of the mold opening.

The fact that the screw core is made to rotate within the stationary mold permits the core to start smooth rotation on one hand and prevents the molded product from idling on the other (the female part of the stationary mold is provided internally with knurls or similar concaves and convexes which serve as a stopper to prevent the rotation of the molded product), thereby facilitating the stripping of the molded product smoothly from the stationary mold during the mold opening operation.

Since certain changes and modifications may be made in the above described construction and different embodiments may be made of the invention without departing from the spirit or scope thereof, it is intended that all the matter contained in the above description and illustrated in the accompanying drawings shall be considered illustrative and not in a limiting sense.

What is claimed is:

1. A mold and a mold control device for use with an injection molding machine, comprising, in combination, a stationary mold incorporating at least one female mold, a stationary mold mount on which said female mold is mounted, at least one rotating core having male screwthreads around its outer periphery aligned with said female mold for engagement with the female mold, a reciprocally movable mold clamp on which said core is mounted, an ejector plate slidably mounted on said mold clamp for movement parallel to the reciprocal movement of said mold clamp, a control screw member coupled with said core, a motor coupled to said control screw member for rotating said control screw member in both the forward and reverse directions, a moving plate threadedly engaging said control screw member to change the rotary motion thereof into reciprocating motion at least one shaft on said moving plate slidable through said mold clamp and coupled to said ejector plate to push said ejector plate forward and in a retracting direction when the control screw member is rotated in the forward and reverse directions respectively, whereby said ejector plate is advanced in synchronism with the rotation of said core in the forward direction and said ejector plate knocking the molded product off said core, and thereafter the ejector plate is retracted to a predetermined position with rotation of said control screw member in the other direction.

2. A mold and mold control device as claimed in claim 1 in which there are a plurality of female molds and cores, and further comprising a gear box in said mold clamp, a main gear and a plurality of planet gears meshing therewith in said gear box, said main gear being coupled with said control screw member and said planet gears being coupled to corresponding cores, thereby permitting the automatic production of a plurality of plastic molded products during one cycle of injection operation of the machine.

References Cited

UNITED STATES PATENTS

| | | | |
|---|---|---|---|
| 2,514,486 | 7/1950 | Green | 18—2 X |
| 2,984,862 | 5/1961 | Chabotte | 18—2 |
| 2,363,808 | 11/1944 | Sayre | 18—2 |

WILBUR L. McBAY, *Primary Examiner.*